Dec. 13, 1960 W. A. CHRISTOPHERSON 2,964,737

ADDRESSING CIRCUIT

Filed June 27, 1955 3 Sheets-Sheet 1

INVENTOR.
WARREN A. CHRISTOPHERSON
BY Lippincott and Smith
ATTORNEYS

INVENTOR.
WARREN A. CHRISTOPHERSON
BY Lippincott and Smith
ATTORNEYS

Dec. 13, 1960 W. A. CHRISTOPHERSON 2,964,737

ADDRESSING CIRCUIT

Filed June 27, 1955 3 Sheets-Sheet 3

INVENTOR.
WARREN A. CHRISTOPHERSON

BY Lippincott and Smith

ATTORNEYS

United States Patent Office 2,964,737

Patented Dec. 13, 1960

2,964,737

ADDRESSING CIRCUIT

Warren A. Christopherson, San Jose, Calif., assignor to International Business Machines Corporation, New York, N.Y., a corporation of New York Filed June 27, 1955, Ser. No. 518,102

2 Claims. (Cl. 340—174)

This invention relates to addressing circuits for supplying electric pulses to a plurality of transmission lines selectively or sequentially, and in particular to improvements in addressing circuits for supplying "read-out" pulses to a magnetic core matrix in a digital computer.

For information storage and other purposes in digital computing apparatus, magnetic core matrix devices have been developed using small annular cores of ferromagnetic material which can be magnetized in either of two magnetic polarities, selectively, and which retain a substantial amount of the stored magnetic energy after the magnetizing force is removed. A plurality of these cores are arranged in a matrix, with a plurality of transmission lines threaded through the cores so that each core is linked by a unique combination of two or more transmission lines. The magnetic cores are selectively switched from one magnetic polarity to the other by means of electric pulses supplied to the matrix transmission lines. More detailed descriptions of such matrices can be found in the technical literature—for example, such a matrix is described in the book, "Automatic Digital Calculators," by Booth and Booth, published by Butterworths Scientific Publications, London, 1953, pages 124 through 126. The matrix per se is not a part of the present invention, but is referred to herein to facilitate an understanding of the novel addressing circuits.

In the use and operation of such a matrix, some form of addressing circuit is required to provide electric pulses at specified times through the transmission lines which link a selected one of the magnetic cores. In the case of a two-dimensional matrix, for example, the transmission lines linking the magnetic cores are generally divided into two groups, and the addressing circuit must be capable of supplying electric pulses through any combination of two lines obtained by selecting one transmission line from each group. Various types of addressing circuits have been devised for this purpose, but each of the types heretofore proposed has certain disadvantages.

Addressing circuits using a relay "tree" function table have sometimes been employed in the prior art, but because of the large number of relays required, these circuits are relatively bulky and expensive; and, if mechanical relays are used, their operating speed is low. Accordingly, one object of this invention is to provide an addressing circuit which is relatively compact and inexpensive, and which can be operated at reasonably high speeds.

Completely electronic addressing circuits have been devised, but heretofore these have generally required a substantial number of high speed electron tube devices as "drivers" supplying large-amplitude, short-duration driving pulses to respective parts of the circuits, and as a result these circuits also have been relatively bulky, and they have been expensive to construct, maintain, and operate. Accordingly, another object of this invention is to provide an improved addressing circuit in which a single high-speed driver supplies pulses to any selected combination of the matrix transmission lines.

The present invention employs saturable core pulse transformers as gating devices in a function table for connecting a high-speed driver to a selected combination of the matrix transmission lines. Function tables employing saturable core transformers have been proposed prior to the present invention—for example, a saturable core transformer type of function table is described in the book "Automatic Digital Calculators," hereinbefore referred to, pages 110 and 111. According to the prior art, such a function table may consist of several saturable magnetic cores upon each of which there is wound a pulse input winding, a pulse output winding, and a plurality of select windings. The input windings are connected in series to a high speed driver, and are supplied as selected times with a driving current pulse. The output windings are connected to respective lines in one group of the matrix transmission lines. Similar function tables may be provided for other transmission line groups of the matrix. Direct currents are supplied to selected ones of the select windings for saturating all but one of the magnetic cores in each function table, so that the transformers supply pulses of substantial magntitude to only one selected line in each group of the matrix transmission lines. (As used in this application, the term "direct current" refers to a unidirectional current which does not change substantially during a short time interval under consideration, and the term includes current pulses having a long duration relative to the short-duration driving pulses.)

This prior-art saturable transformer arrangement has certain advantages over other prior art types of function table, but it also has disadvantages in that rectangular hysteresis loop core materials are required for best results, and in the fact that each select winding must provide a magnetizing force substantially as large as that provided by the driving pulse. Furthermore, large output pulses may be produced when the currents through the select windings are changed, so that additional apparatus is often required for suppressing the undesired pulses, which may increase the cost and complexity of the circuit and introduce other disadvantages. Accordingly, still further objects of the present invention are to provide a saturable core type of function table which can be operated with relatively small currents supplied to the select windings, and to prevent the production of undesired output pulses when energization of the select windings is changed. Other objects and advantages will appear as the description proceeds.

Briefly stated, in accordance with one aspect of the present invention, an improved addressing circuit includes a function table composed of several saturable core transformers each having a pulse input winding, a pulse output winding and select windings. Biasing means preferably are provided so that each transformer core is biased substantially to magnetic saturation in the absence of any current through the input and select windings. Select currents are provided through the select windings to magnetize only a selected one of the transformer cores substantially to magnetic saturation with a magnetic polarity opposite to that of the bias magnetization, and a driving current pulse is provided through the input windings to produce a magnetizing force having the same polarity as the bias magnetization, so that only the selected core receives a large and rapid magnetic flux change which induces a large pulse in the output winding.

In accordance with another aspect of this invention, current through one set of select windings produces magnetizing forces of a polarity opposite to those produced by the driving pulse, so that the driving pulse changes the magnetic flux in a selected transformer core from saturation in one polarity to saturation in the opposite polarity, whereby a flux change of maximum magnitude is provided in the core of the selected transformer to induce a large output pulse. Currents through other sets of select windings produce magnetizing forces of the same polarity as those produced by the driving pulse and inhibit the generation of large output pulses by unselected transformers.

In accordance with another aspect of the invention, biasing and select currents apply continuous saturating magnetizing forces to all of the function table transformer cores throughout a time interval during which the driving pulse is applied, so that the use of transformer cores having rectangular hysteresis loops is not required. Since the magnetic gating action of the function table does not depend upon rectanguler hysteresis loop characteristics, ampere turns of the input and select windings can be conserved by the use of core material having narrow hysteresis loop characteristics, such as Permalloy. Consequently, the improved apparatus can be more compact, less expensive, and electrically more efficient than prior apparatus for similar purposes.

In accordance with still another aspect of this invention, the magnetic bias and the select currents overdrive the selected transformer core only a small amount beyond saturation, so that changes in the select currents produce output pulses of insignificant amplitude and relatively long duration. The input driving pulse produces a large overdrive of the selected core, which provides an output pulse of large amplitude and relatively short duration.

The invention will be better understood from the following description taken in connection with the accompanying drawings, and its scope will be pointed out in the appended claims. In the drawings, Fig. 1 is a schematic circuit diagram showing a magnetic core matrix connected to an improved matrix addressing circuit;

Figure 1:
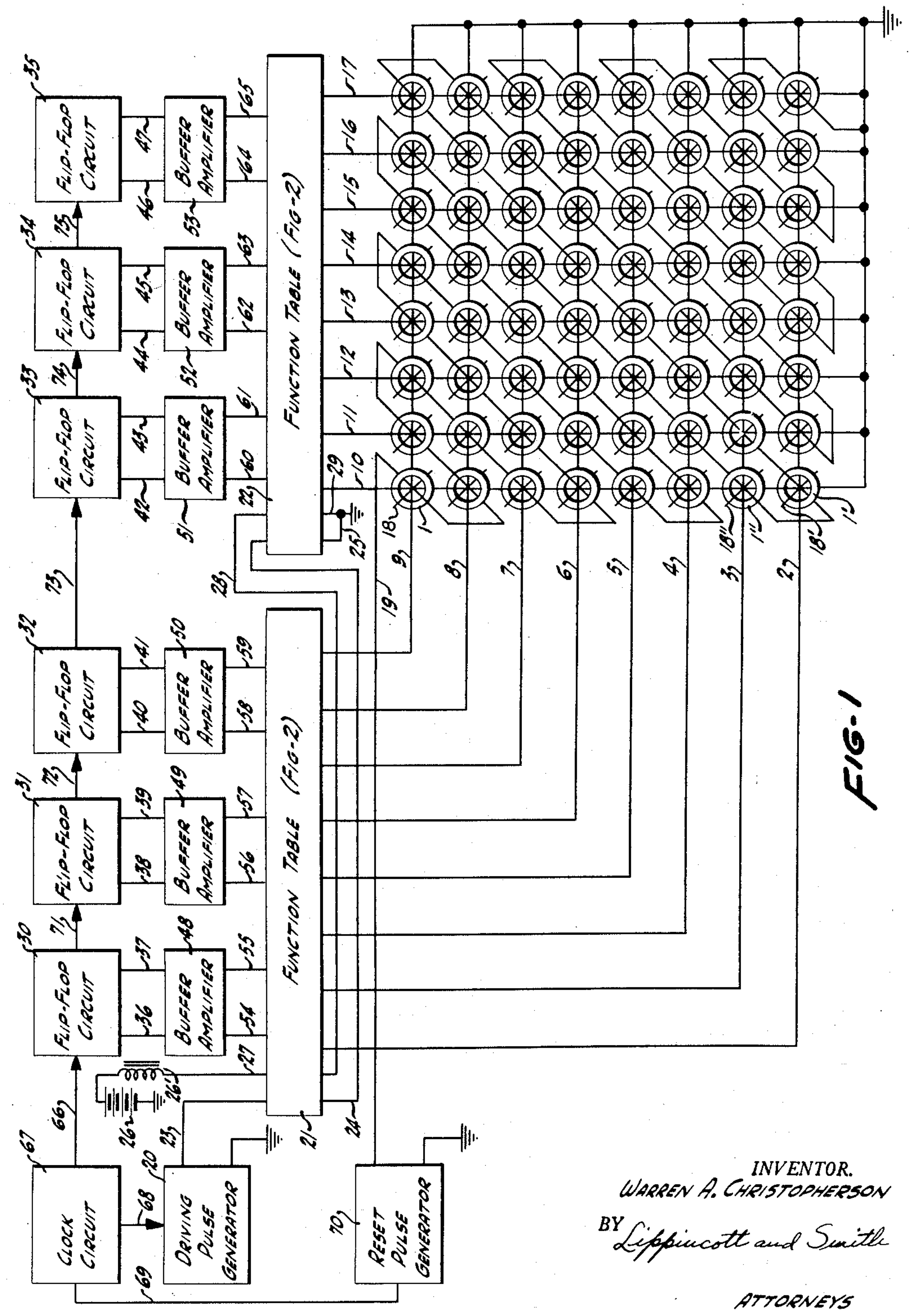

Referring now to Fig. 1 of the drawing, a magnetic core matrix has a plurality of ferromagnetic cores 1, which may be small rings of ferromagnetic material, preferably a ferrite. The matrix shown in the drawing is two-dimensional, with 64 cores arranged in eight rows and eight columns. However, in principle the matrix may have any desired number of rows and columns, and the matrix configuration may have any desired number of dimensions. A plurality of transmission lines are threaded through the cores as shown, so that a unique combination of transmission lines links each core. A first group of eight transmission lines, identified in the drawing by reference numerals 2 through 9 inclusive, extend horizontally through the matrix and link respective rows of matrix cores. A second group of eight transmission lines, identified in the drawing by reference numerals 10 through 17 inclusive, extend vertically through the matrix and link respective columns of the matrix cores.

If a matrix having more than two dimensions were employed, an additional group of transmission lines would be provided for each additional matrix dimension. For example, a three dimensional matrix could be formed by adding 64 additional cores in a plane parallel to the plane of the drawing. Transmission lines 2 through 17 would be extended through corresponding rows and columns of the core in both planes, and a third group of transmission lines would be added having lines respectively linking all of the cores in each plane. In a similar manner, any additional number of planes can be added in the third matrix dimension, and additional matrix dimensions may be provided, if desired.

Each of the matrix cores 1 can be magnetized with either of two magnetic polarities, selectively, which can be designated arbitrarily the positive magnetic polarity and the negative magnetic polarity. For convenience, the polarity of the magnetizing forces produced by currents in transmission lines 2 through 17 inclusive is herein called the positive magnetic polarity. When one of the matrix cores has once been magnetized with a given polarity, it retains a substantial portion of the stored magnetic energy after the magnetizing force is removed, and thus remains magnetized with that polarity until there is applied to the core a magnetizing force of the oposite polarity and of sufficient magnitude to shift the magnetic flux in the core to the other side of the magnetic hysteresis loop. This magnetic polarity change is equivalent to a relatively large magnitude change of the magnetic flux in the core, and induces a voltage pulse of substantial amplitude in each transmission line linking the core.

To shift the magnetic polarity of the matrix cores from negative to positive magnetic polarity, read-out current pulses are provided through selected ones of the transmission lines 2 through 17 by an addressing circuit hereinafter described. These current pulses are of such amplitude that a current pulse through only one of the transmission lines linking a core provides insufficient magnetizing force to change the magnetic polarity of that core, while coincident pulses through two transmission lines linking the same core do change the core magnetization from the negative to the positive polarity. Consequently, if coincident pulses are provided through one of the horizontal transmission lines and one of the vertical transmission lines, the magnetization of only one matrix core is shifted from the negative to the positive magnetic polarity.

It is known to those skilled in the art that core matrices of the type described can be used for a variety of purposes, such as information storage and the production of pulses for character generation. Since the present invention is concerned with novel addressing circuits which supply current pulses to selected ones of the matrix transmission lines 2 through 17, and not to the matrix per se, one use of the core matrix is herein described as an illustrative example only; and it will be understood that this invention is not limited to a specific use of the matrix. Those skilled in the art will appreciate that addressing circuits embodying principles of this invention may be employed with other apparatus—in particular, with matrices used for purposes other than those herein described.

In the illustrative embodiment herein described, each of the matrix cores 1 is linked by one of 64 output transmission lines 18, represented in the drawing by transmission line segments extending diagonally downward to the right through respective ones of the matrix cores. It may be desired, for example, to produce electric pulses in each of the 64 output lines sequentially.

Assume that all of the matrix cores 1 are initially magnetized with negative magnetic polarity. In a manner hereinafter more fully explained, the addressing circuit first produces coincident "read-out" pulses through transmission lines 2 and 10. These pulses shift the magnetization of core 1′ from the negative to the positive polarity, which induces an electric pulse in output line 18′. The addressing circuit next produces coincident "read-out" current pulses in transmission lines 3 and 10, and this shifts the magnetic polarity of core 1″ and induces an electric pulse in output line 18″. Coincident "read-out" current pulses are provided successively through each combination of one horizontal matrix transmission line and one vertical matrix transmission line until all of the matrix cores have been shifted to the positive magnetic polarity, so that electric pulses are induced in each of the output lines 18 sequentially. Next a "reset" current pulse is provided through a transmission line 19 which is linked to all 64 of the matrix cores 1 in such a way that the "reset" pulse resets all 64 cores to the negative magnetic polarity, whereupon the entire cycle of operation may be repeated.

A high-speed driving pulse generator 20 is the pulse source for all of the transmission lines 2 through 17 inclusive. Pulse generator 20 can be any suitable device, such as a conventional blocking oscillator, for producing relatively large pulses of short duration. The driving pulses are directed to a selected one of the horizontal matrix transmission lines, 2 through 9, by a saturable core type of function table 21, hereinafter more fully described. An identical function table 22 directs driving pulses to a selected one of the vertical matrix transmission lines, 10 through 17. The pulse input windings of function tables 21 and 22 are connected in series to driving pulse generator 20 through transmission lines 23, 24 and 25. Bias current is supplied to the function tables by suitable means such as a battery 26 connected to bias windings of the function tables through transmission lines 27, 28 and 29.

Selection of the horizontal and vertical transmission lines which are to receive coincident read-out pulses is controlled by select currents applied to the function tables by an array of low-speed drivers which may consist of a binary counting circuit or register and a plurality of buffer amplifiers. In the embodiment illustrated, the counting circuit consists of six cascade-connected flip-flop circuits, identified in the drawing by reference numerals 30 through 35 inclusive. Each flip-flop circuit has a pair of output lines, identified by reference numerals 36 through 47 inclusive, which are connected through buffer amplifiers 48 through 53 to respective ones of the function table select lines 54 through 65, inclusive.

Each of the flip-flop circuits has two stable states of operation: a first state in which the even numbered output line is more positive than the odd numbered output line, and a second state in which the odd numbered output line is more positive than the even numbered output line. The associated buffer amplifier supplies current through either of the two select lines to which it is connected, selectively, depending upon the state of the corresponding flip-flop circuit. For example, flip-flop circuit 30 supplies voltages through lines 36 and 37 to buffer amplifier 48, in response to which amplifier 48 supplies current through either of select lines 54 and 55, selectively, depending upon the state or operating condition of flip-flop circuit 30. Since each of the flip-flop circuits has two alternative operating states, the counting register as a whole has a number of states equal to the sixth power of 2, and each one of these register states can be considered as representing a six place binary number. The same binary number is represented by the currents transmitted through the select lines to the function tables.

The counting circuit or register is progressively switched from one state to another by pulses supplied to the input of the first flip-flop circuit 30 through transmission line 66 by a clock circuit 67, which can be a part or parts of digital computing apparatus known to those skilled in the art. Clock circuit 67 may also supply triggering or synchronizing pulses through line 68 to driving pulse generator 20. In the embodiment illustrated, clock circuit 67 supplies pulses alternately through lines 66 and 68, and at the end of a counting cycle supplies a pulse through line 69 to trigger a reset pulse generator 70. In practice, the reset pulse supplied through line 69 may be derived from the output of flip-flop circuit 35. When so triggered, pulse generator 70 supplies current through transmission line 19 to reset all of the matrix cores 1 to the negative magnetic polarity.

Assume that all of the matrix cores 1 have been reset to the negative magnetic polarity, and that the state of the counting circuit or register is such that the even numbered ones of the lines 36 through 47 are at a more positive potential than the odd numbered ones of these lines. The buffer amplifiers now supply current through the even numbered ones of select lines 54 through 65, and under these conditions function tables 21 and 22 are set for transmitting driving pulses to transmission lines 2 and 10. Now assume that clock circuit 67 supplies a triggering pulse through line 68, whereupon driving pulse generator 20 provides a pulse of current through lines 23, 24, 25. Driving or "read-out" pulses are supplied through transmission lines 2 and 10, and matrix core 1' is shifted to the positive magnetic polarity, whereupon a pulse is induced in output line 18'.

Clock circuit 67 now supplies a pulse through line 66, and flip-flop circuit 30 changes its state, whereupon line 37 becomes more positive than line 36 and buffer amplifier 48 supplies current through select line 55 rather than through select line 54. Function table 21 is now set for transmitting a driving pulse to transmission line 3, and when clock circuit 67 next sends a triggering pulse through line 68, matrix core 1'' is shifted to the positive magnetic polarity and an output pulse is provided in line 18''.

The next pulse transmitted by clock circuit 67 through line 66 returns flip-flop circuit 30 to its first state, but in so returning circuit 30 transmits a pulse through line 71 which produces a change of state in flip-flop circuit 31. Accordingly, the next driving pulse provided by generator 20 is transmitted by the function tables through transmission lines 4 and 10. Alternate ones of the changes of state of each flip-flop circuit supply pulses to change the state of the next following flip-flop circuit through the connecting lines 71, 72, 73, 74 and 75 respectively, so that driving pulses are supplied successively to each combination of one horizontal and one vertical matrix transmission line until all 64 cores of the matrix have been shifted to the positive magnetic polarity.

Clock circuit 67 (or flip-flop circuit 35, alternatively) then provides a timing pulse through line 69 which triggers reset pulse generator 70, whereupon a pulse of current is provided through line 19 which resets all of the matrix cores to the negative magnetic polarity, and the operating cycle may be repeated.

In other uses of core matrices of the general type described—in information storage circuits, for example—means may be provided for resetting the matrix cores individually, or means may be provided for shifting selected cores to the positive polarity prior to application of the read-out pulses. For example, selected cores could be shifted in polarity by current pulses supplied through lines 18. Then, when read-out pulses are supplied by the addressing circuits, output pulses are provided only when coincident read-out pulses are supplied to transmission lines linking a core magnetized in the negative polarity. In this case output pulses in a serial presentation can be obtained from the line 19 which links all of the cores.

Alternatively, the addressing circuit shown, or other similar addressing circuit, can supply read-in pulses to store information in the matrix. For example, assume that all of the matrix cores are magnetized in the negative polarity, and that the information to be stored is set up in the counting register (flip-flop circuits 30 through 35). Now assume that a read-in trigger pulse is supplied through line 68 to trigger driving pulse generator 20. This shifts a selected one of the matrix cores to positive polarity, and thus stores the desired information in the matrix. This information can be "read-out,"

whenever desired, by a negative pulse through line 19, or by coincident negative pulses supplied through selected ones of lines 2–9 and 10–17, or other lines parallel thereto, by another addressing circuit.

Principles of this invention can also be used in addressing circuits for matrices of other types, such as the saturable capacitor matrices discussed at page 126 in the book "Automatic Digital Calculators," hereinbefore identified, and for other purposes.

Figure 2:
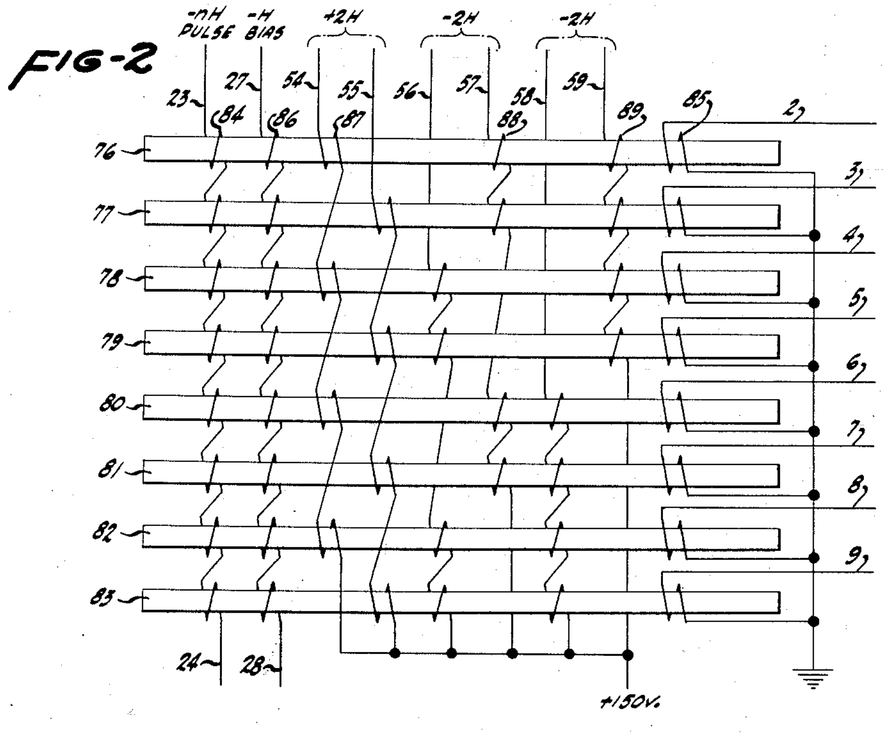
Fig. 2 is a schematic diagram of a novel function table used in the addressing circuit.

Reference is now made to Fig. 2, which shows the electrical circuit of function table 21. The circuit of function table 22 may be similar; and if desired, the two function tables may be combined in a common housing or mounting structure. Function table 21 has eight pulse transformers with saturable magnetic cores, identified in the drawing by reference numerals 76 through 83 inclusive. One core is provided for each of eight output circuits supplying the eight horizontal matrix transmission lines. The principles herein disclosed may be used to construct function tables having any desired number of cores and a corresponding number of output circuits. So that the magnetizing ampere turns can be kept small, thus producing a compact and efficient device, the pulse transformer cores preferably are made of material having a narrow hysteresis loop, which can be brought to magnetic saturation with relatively small magnetizing forces. Toroids made out of 20 wraps of ⅛ mil thick 4–79 Permalloy, with a ⅛ inch inside bobbin diameter, make very satisfactory transformer cores which can be brought to magnetic saturation with a magnetizing force of approximately 150 milliampere turns.

Each of the pulse transformer cores carries a pulse input (or primary) winding, a pulse output (or secondary) winding, a bias winding, and a plurality of select windings. For example, core 76 has an input winding 84, an output winding 85, a bias winding 86, and three select windings 87, 88 and 89. All eight of the input windings are connected in series with transmission lines 23 and 24, as shown, and receive the driving pulses supplied by driving pulse generator 20. All eight of the bias windings are connected in series to transmission lines 27 and 28, and receive bias current from battery 26. The eight output windings are connected to respective ones of the eight horizontal matrix transmission lines 2 through 9, as shown in the drawing.

The three select windings on each core are connected to the six select lines, 54–59, in the manner shown, so that the select windings of each core are connected to the select lines in a unique manner. It will be noted that the even numbered cores have select windings connected to select line 54, while the odd numbered cores have select windings connected to select line 55. Cores 78, 79, 82 and 83 have select windings connected to select line 56, while cores 76, 77, 80 and 81 have select windings connected to select line 57. Cores 80 through 83 have select windings connected to select line 58, while cores 76 through 79 have select windings connected to select line 59.

One of the select windings on each core is wound in a direction for producing a magnetizing force of an arbitrary polarity herein referred to as the positive polarity. The other select windings, the input windings and the bias windings are wound to produce magnetizing forces of the opposite or negative polarity. For example, in the embodiment illustrated, the windings connected to select lines 54 and 55 have a winding direction such that current through these lines produces in the cores magnetizing forces having a polarity which, for convenience, is herein referred to as the positive magnetic polarity. All of the other windings, except the output windings, have the opposite winding direction so that currents through these windings produce magnetizing forces of negative polarity. The output windings may be wound in either direction depending upon the desired polarity of the output pulses.

Assume that H represents a magnetizing force substantially equal to, or slightly greater than, the smallest magnetizing force which will saturate one of the transformer cores. The bias current through lines 27 and 28, and through the bias windings on the cores, is adjusted so that each core is supplied with a bias magnetizing force of $-H$. A select current is supplied to either of the select lines 54 and 55, selectively, which applies to one-half of the transformer cores an additional magnetizing force of $+2H$. A current through either of the select lines 56 and 57, selectively, supplies to one half of the transformer cores an additional magnetizing force equal to $-2H$, and current through either of the select lines 58 and 59, selectively, applies to one-half of the cores still another magnetizing force equal to $-2H$.

Assume, for example, that during a selected time interval current is supplied through select lines 54, 56 and 58. The net effect upon the transformer cores of the bias and select currents is that a net magnetizing force equal to $+H$ is applied to core 76, so that core 76 is saturated with a positive magnetic polarity, and net magnetizing forces respectively equal to $-H$, $-3H$ and $-5H$ are applied to the other cores, so that cores 77 through 83 are saturated with a negative magnetic polarity. During selected short time intervals under consideration, the select currents are in effect direct currents, so that the magnetizing forces which they apply to the cores are continuous within such time intervals and core materials having rectangular hysteresis loop charcteristics are not required.

Now assume that a driving pulse of unidirectional current is supplied through line 23 to the input windings during a small portion of the same selected time interval, and that this driving pulse applies to each core a magnetizing force $-nH$ of negative polarity and of a magnitude several times larger than H. The driving pulse quickly switches the magnetization of core 76 from positive saturation to negative saturation; and the sudden large change of flux within core 76 induces a large pulse in output winding 85, which is transmitted to the matrix through transmission line 2. The magnetizing forces produced by the input pulse have very little effect upon the magnetization of cores 77 through 83, since these cores were already magnetized to saturation in the negative polarity. Consequently, the pulses supplied to transmission lines 3 through 9 are insignificantly small and have no practical effect upon the magnetization of the matrix cores 1.

Whenever the currents in the select lines are changed between the selected time intervals during which driving pulses are applied, a different one of the transformer cores receives the $+H$ magnetizing force, and the next input pulse induces a large pulse in the output winding of that transformer core only. Thus, means is provided for gating a driving pulse selectively to any one of the eight horizontal matrix transmission lines. In a similar manner, function table 22 gates a driving pulse to a selected one of the vertical matrix transmission lines.

Assuming that a magnetizing force of 150 milliampere turns is required to saturate each of the transformer cores 76 through 83, the bias current through transmission lines 27 and 28 may be adjusted to 150 milliamperes, and each of the bias windings on the transformer cores can be a one-turn winding. Similarly, if the select windings are each one-turn windings, the select currents through the selected ones of lines 54 through 59 should be 300 milliamperes. If multiple-turn windings are employed, as is generally desirable, these current values are divided in each instance by the number of winding turns, so that each ampere-turns product has the desired value. The magnetizing force provided by a driving pulse through the input winding should be at least several times as large as H, and in the embodiment described may desirably be about 1000 milliampere turns. Preferably, the select lines 54 through 59 are connected through the select windings to a source of positive potential, plus 150 volts for example, which supplies plate voltage to the buffer amplifiers hereinafter described.

Since the output windings supply low-impedance transmission lines, the output windings preferably are low-impedance windings which match the transmission lines impedances. For example, each output winding may be a single turn of relatively large diameter wire. The input windings preferably are relatively high-impedance windings, such that the impedance of all of the input windings in series matches the impedance of the driving pulse generator when the generator is driving or supplying a driving pulse. In this connection, it should be noted that only one input winding in each function table—the input winding on the selected transformer core—contributes a substantial amount of input circuit inductance, since the other windings are on cores, saturated in the negative polarity, within which little change of magnetic flux is produced by the driving pulse.

Each input winding preferably is a multi-turn winding, so that each transformer has a step-down turns ratio between the input and output windings and is capable of supplying large output current pulses. The select windings are connected in high-impedance circuits, as hereinafter described, so that the select windings do not load the transformers appreciably when driving pulses are applied to the input windings. For the same reason, the bias windings also are connected in a high-impedance circuit, and for this purpose a resistor or an inductor 26' may be connected in series with battery 26, as is shown in Fig. 1. It is also preferred that the output impedance of driving pulse generator 20 be higher when not driving than when driving, in order to reduce the coupling between transformer cores during the changing of the select currents.

An important advantage of the addressing circuit described is that large output pulses are not produced by changes in the select currents, prior to application of a driving pulse to the selected transformer. The reason is as follows:

When a magnetic core is driven from saturation in one magnetic polarity to saturation in the other polarity, a voltage pulse is induced in any winding upon the core, such as the pulse output windings connected to the matrix transmission lines. The time interval required to produce the flux change from positive to negative saturation, and hence the duration of the output pulse, is proportional to the reciprocal of overdriving magnetizing force. The amplitude of the output pulse is inversely proportional to its duration. That is, if the magnetizing force producing a change in magnetic polarity is only slightly larger than the steady-state magnetizing force required to saturate the core, then the overdriving magnetizing force is small, the magnetic flux in the core changes at a relatively slow rate, and the output pulse has a relatively small amplitude and long duration.

On the other hand, if the magnetizing force which produces a change in magnetic polarity of the core is much larger than the steady-state magnetizing force required to produce saturation of the core, then the overdriving magnetizing force is large, the flux change within the core takes place rapidly, and the output pulse is of relatively large amplitude and short duration. Assuming that the load impedance of the output circuit is resistive, the current pulse in the output circuit has substantially the same waveform as the induced voltage pulse.

Figure 3:
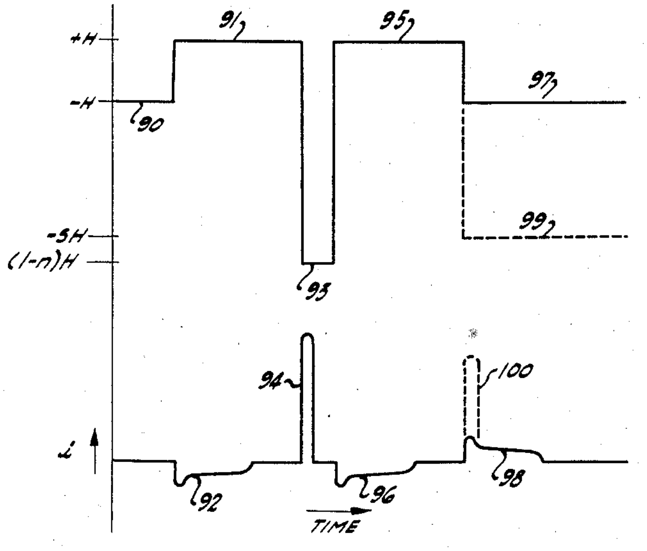
Fig. 3 is a diagram of magnetic and current wave forms useful in explaining the operation of the addressing circuit.

Refer now to Fig. 3, which is a diagram showing magnetizing forces applied to one of the saturable transformer cores and the resulting current waveforms in its output winding. Assume that initially the core is subjected to a magnetizing force of $-H$ by the bias winding. This is represented in Fig. 3 by horizontal line 90. When the core under consideration is to be set for the transmission of a driving pulse to the output circuit, a current is supplied through one of the select windings which applies a magnetizing force of $+2H$, so that the net magnetizing force applied to the core is shifted to $+H$, represented in Fig. 3 by horizontal line 91. This flux change produces a pulse 92 in the output winding of the transformer, but since the value of $+H$ is about the same as the magnetizing force required to just saturate the core with positive polarity, the overdriving magnetizing force is quite small and consequently the change from negative to positive magnetic polartiy takes a relatively long time—5 to 10 microseconds, for eaxmple. Because of the slow flux change, the output pulse 92 is of relatively small amplitude and long duration. Even though pulse 92 is transmitted to the matrix, its amplitude is too small to materially affect the magnetization of the matrix cores 1.

When a driving pulse is applied to the input winding, producing an additional magnetizing force of $-nH$, where $n$ is a number substantially larger than 2, the net magnetizing force applied to the core becomes $(1-n)H$, as is represented in Fig. 3 by horizontal line 93. The flux change from positive to negative saturation produces a pulse 94 in the output winding which is transmitted to the matrix as a read-out pulse. In this case, the magnetizing force $(1-n)H$ is much larger than would be required to just saturate the core with negative polarity—in other words the overdriving magnetizing force is large—and consequently the magnetization of the core changes from positive saturation to negative saturation in a relatively short time—three-quarters to one microsecond, for example. As a result, the output pulse 94 is of large amplitude and short duration. The coincident production of two such large output pulses by the two function tables shifts the magnetization in a selected one of the matrix cores from negative to positive polarity.

Upon termination of the driving pulse in the input winding, the net magnetizing force applied to the core again shifts to $+H$ as indicated by line 95, and a pulse 96 is produced in the output circuit. Once again the overdriving magnetizing force is small, and consequently pulse 96 is of insignificantly small amplitude and relatively long duration. Pulse 96 is of negative polarity. It is important to note that a large negative output pulse at this time would be undesirable, since it might shift the magnetization of the selected matrix core back to the negative polarity. With prior transformer-type function tables, rectifiers in the output circuits have generally been required to suppress the negative pulses. With the present invention, the need for such rectifiers is eliminated, since the negative pulses are of insignificant amplitude.

Now when the select currents are changed to set another of the transformer cores for transmitting a driving pulse, the magnetization of the first core is shifted back to negative saturation. If the new magnetizing force is equal to $-H$, as indicated by line 97, the output pulse 98 will be of small amplitude and long duration. On the other hand, if the new magnetizing force is $-3H$ or $-5H$, as indicated by broken line 99, a relatively large output pulse 100 may be produced. With the matrix described, however, the pulse 100 is not objectionable, since it has the same polarity as the preceding driving pulse 94, and thus it can have no material effect upon the matrix core which has already been shifted to the positive magnetic polarity. In the addressing circuit described, a change in select currents cannot produce a large positive output pulse at any time except immediately after a read-out pulse, when the positive pulse is unobjectionable. Large negative output pulses are never produced.

If in any instance the pulse 100 were objectionable, its formation could be avoided in any of several ways. For example, the time constants of the select circuits can be made sufficiently large that changes in the select currents must occur slowly, so that the select current changes can never produce a large output pulse. A convenient way of doing this is to place an inductor in series with each cathode resistance in the buffer amplifiers hereinafter described. Or the select windings may be made high-impedance multi-turn windings, or a capacitor can be connected between each buffer amplifier control grid and ground. Alternatively, it can be arranged that the select currents are interrupted for a short interval before each change, so that the initial change in magnetizing force from +H is always merely to −H, a small overdrive which will produce an insignificant output pulse. This can be accomplished by applying negative pulses to the control grids of the buffer amplifiers.

Figure 4:
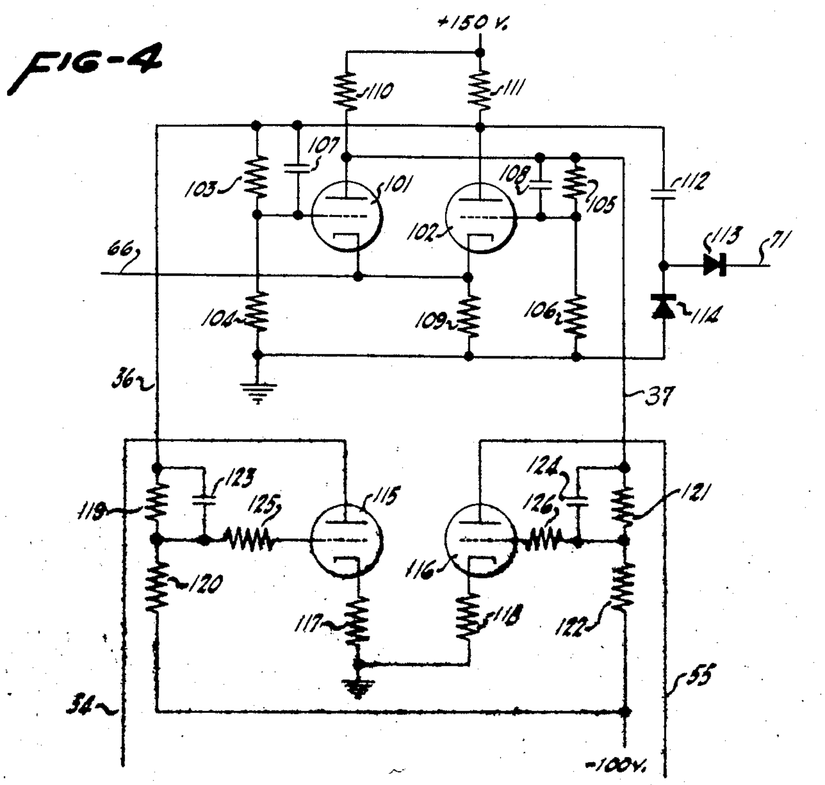
Fig. 4 is a circuit diagram showing a flip-flop circuit and buffer amplifier used to energize one set of select windings in the function table.

Fig. 4 is a simplified circuit diagram showing one type of flip-flop circuit 30 and buffer amplifier 48 which may be used in the improved addressing circuit. The other flip-flop circuits and buffer amplifiers may have identical circuits. The flip-flop circuit 30 is essentially a conventional bistable multivibrator which includes two triode vacuum tubes 101 and 102 connected in a circuit in such a way that only one of the triodes is conductive at any given time. Multigrid tubes such as tetrodes or pentodes may be used if desired. The control grid of triode 101 is connected to a voltage divider comprising resistors 103 and 104 connected in series across the plate of triode 102 so that tube 101 is cut off when tube 102 is conductive. The control grid of triode 102 is connected to a voltage divider comprising resistors 105 and 106 connected in series across the plate of tube 101. Capacitors 107 and 108 preferably are connected in parallel with resistors 103 and 105 respectively.

The cathodes of the two triodes are connected to a common cathode resistor 109, and the two anodes are connected through resistors 110 and 111 respectively to a source of positive potential—a potential of +150 volts, for example. Input line 66 is connected to both cathodes so that a positive input pulse cuts off the conductive triode, whereupon the plate voltage of this triode rises and the other triode becomes conductive. Alternatively, input line 66 may be capacitively coupled to the control grids of both triodes, and if desired the flip-flop circuit can be made responsive to input pulses of negative polarity.

Means are provided for transmitting a triggering pulse to the next succeeding flip-flop upon each alternate one of the changes in operating state of the flip-flop under consideration. For example, the plate of triode 102 may be connected through a capacitor 112 and a rectifier 113 to the input line 71 of the next succeeding flip-flop circuit 31. Whenever the flip-flop circuit switches from the state in which triode 102 conducts current to the state in which triode 101 conducts current, a positive pulse is transmitted through line 71 to change the operating state of the next flip-flop circuit. A rectifier 114 may be connected as shown to prevent the transmission of negative pulses through line 71.

In a first operating state of the flip-flop circuit, tube 101 is conductive and line 36 is maintained at a more positive potential than line 37. For example, line 36 may be at a potential of +140 volts, while line 37 is at a potential of +40 volts. In the second operating state of the flip-flop circuit, triode 102 is conductive and the line 37 is at a potential of +140 volts while line 36 is at a potential of +40 volts.

A preferred form of the buffer amplifier includes two triode vacuum tubes 115 and 116 connected as shown. Multigrid tubes may be used if desired. The cathodes of triodes 115 and 116 are connected to ground through cathode resistors 117 and 118, respectively, which provide degenerative current feedback for regulating the amplitudes of the select currents. The plates of tubes 115 and 116 are respectively connected to select lines 54 and 55, and are maintained at a positive potential by connection of the function table select windings to a +150 volt supply, as is shown in Fig. 2. Lines 36 and 37 are connected to a −100 volt supply through resistor voltage dividers 119—120 and 121—122, respectively. Capacitors 123 and 124 are respectively connected in parallel with resistors 119 and 121.

The control grid of triode 115 is connected through a resistor 125 to a tap of voltage divider 119—120, so that triode 115 is cut off when line 36 is at a potential of +40 volts, but supplies current through select line 54 when line 36 is at a potential of +140 volts. The control grid of triode 116 is connected through a resistor 126 to a tap on voltage divider 121—122, so that triode 116 is cut off when line 37 is at a potential of +40 volts, but supplies current to select line 55 when line 37 is at a potential of +140 volts. In this way current is supplied to either of the select lines 54 and 55, selectively, depending upon the operating state of the flip-flop circuit. Each time that a triggering pulse is transmitted through line 66, the operating state of the flip-flop circuit is shifted, and the select current is shifted from one to the other of the select lines 54 and 55.

It will be noted that one high-speed, high-power driving pulse generator 20 supplies pulsed power to all of the matrix transmission lines, selectively, through the two function tables. The flip-flop and buffer amplifier circuits can be relatively low-speed, low-power devices which are considerably less expensive to manufacture, to maintain and to operate. The addressing circuit is considerably simpler, and capable of more compact construction than matrix addressing circuits heretofore available for like purposes. Since the select lines are connected to the plates of the buffer amplifiers, the select circuits have a high impedance and the select windings do not materially load the selected transformers when driving pulses are supplied to the function tables.

Figure 5:
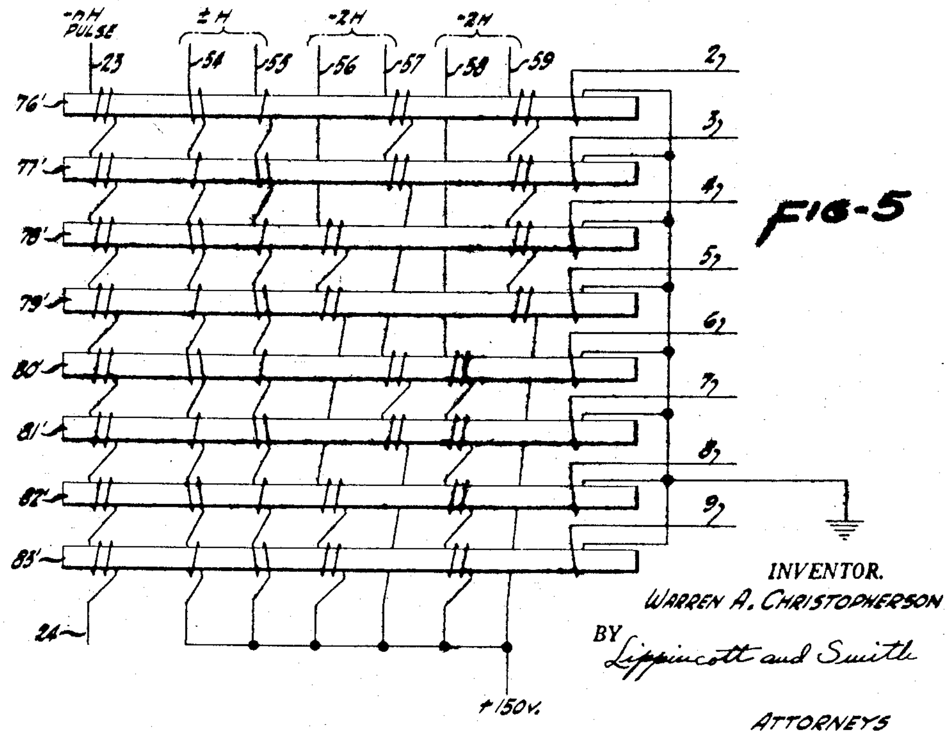
Fig. 5 is a schematic diagram of an alternative function table.

An alternative form of function table 21 is shown in Fig. 5, wherein the eight transformers have saturable magnetic cores 76′ through 83′, inclusive. Each transformer has input and output windings similar to those of the function table illustrated in Fig. 2, but in the embodiment illustrated in Fig. 5, the select windings are differently arranged and there are no bias windings.

Referring now to Fig. 5, currents provided selectively through select windings connected to select lines 56, 57, 58 and 59 each apply to selected ones of the transformer cores magnetizing forces of −2H, in the manner hereinbefore explained in connection with Fig. 2. Each of the cores 76′ through 83′ also carries two select windings connected to select lines 54 and 55, respectively, and wound in such a direction that current through the windings connected to line 54 applies a magnetizing force at +H to each of the even numbered cores and also applies a magnetizing force of −H to each of the odd numbered cores. Current through the windings connected to line 55 applies a magnetizing force of −H to each of the even numbered cores and applies a magnetizing force of +H to each of the odd numbered cores. When currents are supplied through selected ones of the select lines in the manner hereinbefore explained, exactly the same net magnetizing forces are applied to respective ones of the cores 76′ through 83′ as are applied under similar circumstances to the corresponding cores 76 through 83 in the Fig. 2 embodiment, and the two function tables operate in substantially the same manner. However, in the Fig. 5 embodiment no biasing means is required.

In the function table shown in Fig. 5, each of the select windings connected to lines 56 through 59 preferably has twice as many turns as each of the select windings connected to lines 54 and 55. Accordingly, the select current supplied through line 54 or line 55, selectively, to provide magnetizing forces of +H or −H, is equal in magnitude to each of the select currents provided through selected ones of lines 56–59 to provide magnetizing forces of −2H. Since twice as many windings are connected in series to each of the lines 54 and 55 as are connected in series to each of the lines 56–59, while each winding connected to lines 54 and 55 has only one-half as many turns as the other select windings, all of the select lines operate into equal load impedances. Consequently, all of the buffer amplifiers 48 through 53 have equal load impedances and can be of identical design.

It will be understood that this invention is not limited to specific embodiments herein illustrated and described, and that the following claims are intended to cover all changes and modifications which do not depart from the true spirit and scope of the invention.

What is claimed is:

1. An addressing circuit comprising four pulse transformers each having a saturable magnetic core, each of said transformers having a pulse input winding, a pulse output winding, a bias winding and two select windings, means supplying to the bias windings of said four transformers a bias current applying to each of said cores a magnetizing force of negative polarity and of sufficient magnitute to saturate the cores, a first select circuit including select windings in first and third ones of said transformers, a second select circuit including select windings in second and fourth ones of said transformers, a third select circuit including select windings in third and fourth ones of said transformers, a fourth select circuit including select windings in first and second ones of said transformers, means supplying during a selected time interval a first select current either to said first select circuit or to said second select circuit selectively, said first select current applying to two of said cores a magnetizing force of positive polarity and of substantially twice the magnitude of said bias magnetizing force, means supplying during said time interval a second select current either to said third select circuit or to said fourth select circuit selectively, said second select current applying to two of said cores a magnetizing force of negative polarity and of substantially twice the magnitude of said bias magnetizing force, whereby a selected one of said cores is saturated in the positive magnetic polarity while the other three cores are saturated in the negative magnetic polarity, and means supplying a unidirectional current pulse to the input windings of said four transformers during a portion of said time interval, said current pulse applying to each of said cores a magnetizing force of negative polarity, whereby a large pulse is induced in the output winding of only the selected one of said transformers.

2. An addressing circuit comprising four pulse transformers each having a saturable magnetic core, each of said transformers having a pulse input winding, a pulse output winding and three select windings, a first select circuit including a select winding in each of said transformers, a second select circuit including a select winding in each of said transformers, a third select circuit including a select winding in third and fourth ones of said transformers, a fourth select circuit including a select winding in first and second ones of said transformers, means supplying a first select current during a selected time interval either to said first select circuit or to said second select circuit selectively, said first select current applying positive magnetizing forces to selected alternate ones of said cores and applying negative magnetizing forces to other alternate ones of said cores, means supplying a second select current during said time interval either to said third select circuit or to said fourth select circuit selectively, said second select current applying negative magnetizing forces to two of said cores, each of the magnetizing forces provided by said second select current being larger than each of the magnetizing forces provided by said first select current so that a selected one of said cores is magnetized in the positive magnetic polarity while three of said cores are magnetized in the negative magnetic polarity, and means supplying during a portion of said time interval through said input windings a unidirectional current pulse applying a negative magnetizing force to all of said cores, whereby a large pulse is induced in a selected one only of said output windings.

References Cited in the file of this patent

UNITED STATES PATENTS

| | | |
|---|---|---|
| 2,691,153 | Rajchman | Oct. 5, 1954 |
| 2,691,155 | Rosenberg et al. | Oct. 5, 1954 |
| 2,719,961 | Karnaugh | Oct. 4, 1955 |
| 2,734,182 | Rajchman | Feb. 7, 1956 |
| 2,734,184 | Rajchman | Feb. 7, 1956 |
| 2,768,367 | Rajchman | Oct. 23, 1956 |
| 2,846,671 | Yetter | Aug. 5, 1958 |
| 2,884,622 | Rajchman | Apr. 28, 1959 |